(12) United States Patent
Han

(10) Patent No.: US 11,362,556 B2
(45) Date of Patent: Jun. 14, 2022

(54) MOTOR

(71) Applicant: LG INNOTEK CO., LTD., Seoul (KR)

(72) Inventor: Jung Ho Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 56 days.

(21) Appl. No.: 16/764,224

(22) PCT Filed: Nov. 15, 2018

(86) PCT No.: PCT/KR2018/013963
§ 371 (c)(1),
(2) Date: May 14, 2020

(87) PCT Pub. No.: WO2019/098690
PCT Pub. Date: May 23, 2019

(65) Prior Publication Data
US 2020/0280228 A1    Sep. 3, 2020

(30) Foreign Application Priority Data

Nov. 16, 2017   (KR) .......................... 10-2017-0153149
Feb. 9, 2018    (KR) .......................... 10-2018-0016280

(51) Int. Cl.
*H02K 1/27*      (2022.01)
*H02K 1/28*      (2006.01)
*H02K 1/2786*    (2022.01)

(52) U.S. Cl.
CPC ............. *H02K 1/2786* (2013.01); *H02K 1/28* (2013.01)

(58) Field of Classification Search
CPC ........ H02K 1/2786; H02K 1/28; H02K 21/22; H02K 11/215; H02K 2213/03; H02K 1/276; H02K 21/14
See application file for complete search history.

(56) References Cited

U.S. PATENT DOCUMENTS

| 6,483,213 B1 | 11/2002 | Hsu |
| 2013/0187506 A1* | 7/2013 | Lee .......................... H02K 1/28 310/156.12 |

FOREIGN PATENT DOCUMENTS

| CN | 102761210 A | 10/2012 |
| CN | 203180671 U | 9/2013 |
| CN | 106059239 A | 10/2016 |

(Continued)

OTHER PUBLICATIONS

Machine Translation, ASANO, JP-2012253884-A, Dec. 2012. (Year: 2012).*

(Continued)

*Primary Examiner* — Thomas Truong
(74) *Attorney, Agent, or Firm* — Saliwanchik, Lloyd & Eisenschenk

(57) ABSTRACT

The present invention may provide a motor including a shaft, a rotor disposed outside the shaft, and a stator disposed outside the rotor, wherein the rotor includes a rotor core surrounding the shaft and a magnet disposed inside the rotor core, the rotor core includes a pocket in which the magnet is disposed, the rotor core is formed by stacking a plurality of plates, a lower end plate of the plurality of plates is disposed to cover at least a part of the pocket, and an upper end plate of the plurality of plates is disposed at a level higher than a level of the magnet.

14 Claims, 15 Drawing Sheets

(56) References Cited

FOREIGN PATENT DOCUMENTS

| | | | |
|---|---|---|---|
| JP | 2005-269804 A | | 9/2005 |
| JP | 2012-253884 A | | 12/2012 |
| JP | 2012253884 A | * | 12/2012 |
| JP | 2015-65789 A | | 4/2015 |
| JP | 2016-171675 A | | 9/2016 |
| JP | 2017-163761 A | | 9/2017 |

OTHER PUBLICATIONS

International Search Report in International Application No. PCT/KR2018/013963, filed Nov. 15, 2018.
Office Action dated Nov. 1, 2021 in Chinese Application No. 201880074356.6.
Office Action dated Apr. 15, 2022 in Chinese Application No. 201880074356.6.

* cited by examiner

MOTOR

CROSS-REFERENCE TO RELATED APPLICATIONS

This application is the U.S. national stage application of International Patent Application No. PCT/KR2018/013963, filed Nov. 15, 2018, which claims the benefit under 35 U.S.C. § 119 of Korean Application Nos. 10-2017-0153149, filed Nov. 16, 2017; and 10-2018-0016280, filed Feb. 9, 2018; the disclosures of each of which are incorporated herein by reference in their entirety.

TECHNICAL FIELD

The present invention relates to a motor.

BACKGROUND ART

A motor rotates to generate power due to an interaction between a rotor including a plurality of magnets and an electromagnetic force generated by coils wound around a stator. Accordingly, the motor includes a shaft rotatably formed, a rotor coupled to the shaft, and a stator fixed inside a housing, and the stator is installed to be spaced apart from the rotor by a gap along a circumference of the stator. In addition, the coils which generate a rotating magnetic field are wound around the stator and electrically interact with the rotor to cause the rotor to rotate. Accordingly, when the rotor rotates, the shaft rotates.

The plurality of magnets are installed on the rotor, and the motor is divided into an inner permanent magnet (IPM) motor in which magnets are inserted into a rotor core 210 or a surface permanent magnet (SPM) motor in which magnets are attached to a surface of a rotor core 210 according to a method of installing the magnets.

In the case of the IPM motor, a pocket is provided in the rotor core, and the magnet is inserted into the pocket. An adhesive is used so that the magnet is fixed to the pocket. The adhesive may be applied into the pocket, and there is a problem in that the applied adhesive flows downward and leaks to the outside of the rotor core.

Technical Problem

The present invention is directed to providing a motor allowing an adhesive to be inhibited from flowing downward and leaking to the outside of a rotor core when the adhesive is used so that a magnet is fixed to a pocket of a rotor.

Objectives that should be solved according to embodiments are not limited to the above described objectives, and other objectives which are not described above will be clearly understood by those skilled in the art from the following specification.

Technical Solution

One aspect of the present invention provides a motor including a shaft, a rotor disposed outside the shaft, and a stator disposed outside the rotor, wherein the rotor includes a rotor core surrounding the shaft and a magnet disposed inside the rotor core, the rotor core includes a pocket in which the magnet is disposed, the rotor core is formed by stacking a plurality of plates, a lower end plate of the plurality of plates is disposed to cover at least a part of the pocket, and an upper end plate of the plurality of plates is disposed at a level higher than a level of the magnet.

The plate may include an annular hub and a plurality of teeth radially protruding from the hub.

An outer diameter of the hub of the lower end plate of the plurality of plates may be greater than an outer diameter of the hub of another plate.

An outer diameter of the hub of the lower end plate may be less than a distance between a center of the rotor core and a center of each of the teeth of the plates in a radius direction of the rotor.

An outer circumferential surface of the hub of the lower end plate may be disposed inside a reference circle passing through a longitudinal center of the magnet in a radius direction of the rotor.

A side surface of each of the teeth may be disposed to be inclined with respect to a reference line passing through a center of each of the teeth and a center of the rotor in a circumferential direction of the rotor.

A side surface of the magnet and the rotor core may be attached by using an adhesive.

A lower surface of the magnet may be in contact with an upper surface of the lower end plate.

The teeth of the upper end plate may not be in contact with the magnet.

Each of the teeth of the plate may include a first protrusion protruding from a side surface of each of the teeth to be in contact with an outer surface of the magnet.

Among the plurality of plates, the plates excluding the lower end plate may include a second protrusion in contact with an inner surface of the magnet.

The motor may further include a sensing plate coupled to the shaft and disposed above the rotor, and a sensing magnet coupled to the sensing plate, wherein a first distance between the sensing plate and the magnet may be less than a second distance between the sensing plate and a stator core of the stator in an axial direction of the shaft.

A difference value between the second distance and the first distance may range from 0.3 mm to 0.9 mm.

The magnet may be divided into a first region disposed at a lower side and a second region disposed at an upper side with respect to an upper end of the stator core in the axial direction of the shaft, and a magnetic flux density of the second region may be less than a magnetic flux density of the first region.

The magnet may be divided into a first region disposed at a lower side and a second region disposed at an upper side with respect to an upper end of the stator core in the axial direction of the shaft, and the second region may be a non-magnetized region.

The stator may include an insulator installed on the stator core, and the first distance may be greater than a third distance between an inner guide of the insulator and the sensing plate in the axial direction of the shaft.

Advantageous Effects

According to embodiments, an advantageous effect is provided in that an adhesive is inhibited from flowing downward and leaking to the outside of a rotor core.

An advantageous effect is provided in that performance of the motor is secured.

An advantageous effect is provided in that, even when a magnet is positioned right below a sensing plate, an upper end portion of the magnet is sufficiently magnetized when a sensing magnet and the magnet are simultaneously magnetized.

MODES OF THE INVENTION

Hereinafter, exemplary embodiments of the present invention will be described in detail with reference to the accompanying drawings. Purposes, specific advantages, and novel features of the invention will be made clear from the exemplary embodiments and the following detailed description in connection with the accompanying drawings. In the description of the invention, detailed descriptions of related well-known functions which unnecessarily obscure the gist of the invention thereof will be omitted.

Although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

Figure 1:
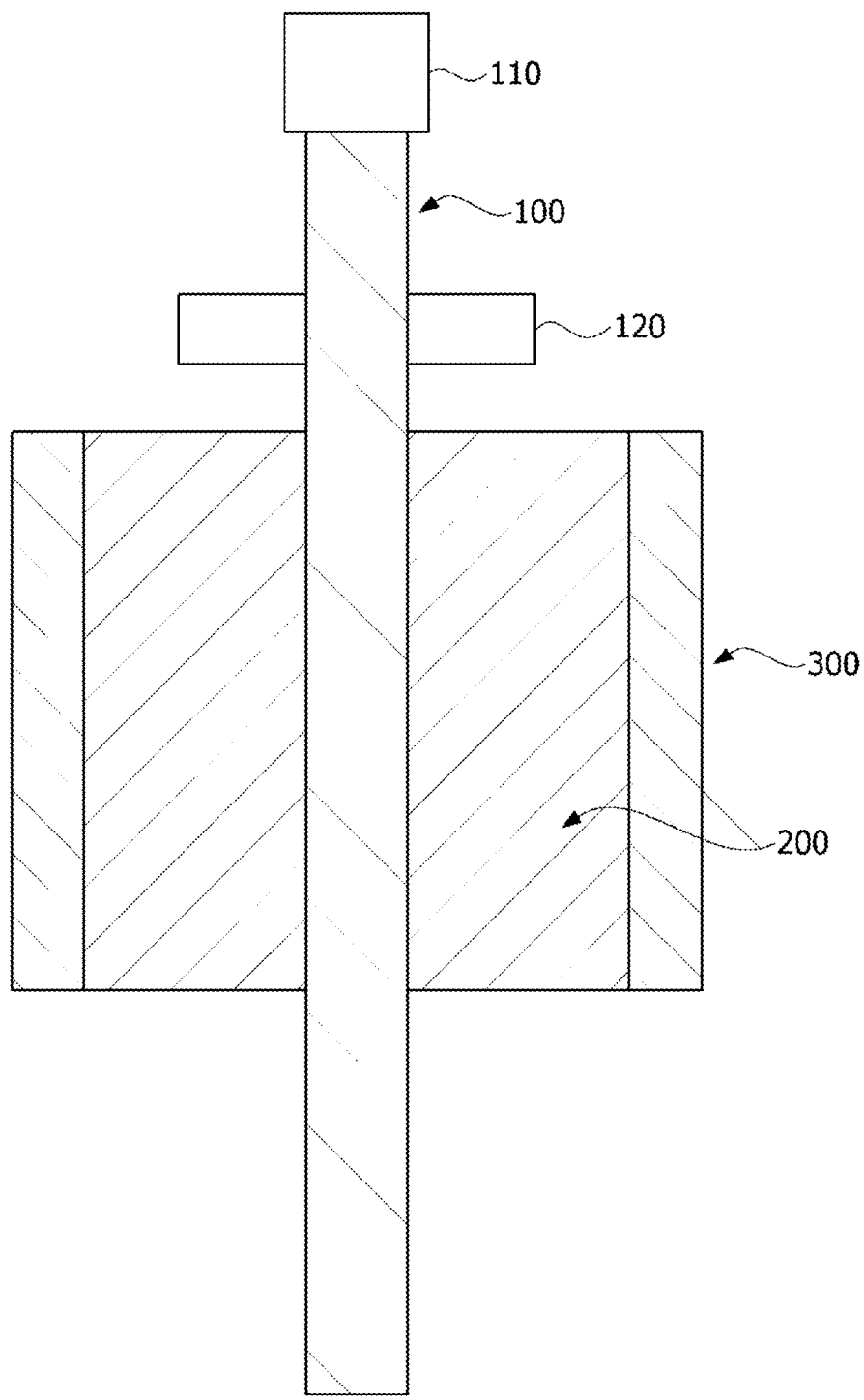
FIG. 1 is a side cross-sectional view illustrating a motor according to an embodiment.

FIG. 1 is a side cross-sectional view illustrating a motor according to an embodiment.

Referring to FIG. 1, the motor according to the embodiment may include a shaft 100, a rotor 200, and a stator 300.

A gear 110 may be disposed on an upper end of the shaft 100. The shaft 100 may be rotatably supported by the bearing 120.

The rotor 200 is disposed inside the stator 300.

The rotor 200 may include a rotor core and magnets. The rotor 200 may electrically interact with the stator 300. When the electrical interaction occurs, the rotor 200 is rotated and the shaft 100 is rotated in conjunction with the rotation of the rotor 200. The shaft 100 may be connected to a transmission of a vehicle and provide power to the transmission.

Coils may be wound around the stator 300 to electrically interact with the rotor 200. A specific structure of the stator 300 to wind the coils around the stator 300 will be described below. The stator 300 may include a stator core including a plurality of teeth. A yoke having an annular shape and the teeth around which the coils are wound in a radius direction from the yoke may be provided in the stator core. The teeth may be provided at predetermined intervals along an outer circumferential surface of the yoke. Meanwhile, the stator core may be formed by stacking a plurality of steel plates. In addition, the stator core may be formed by coupling or connecting a plurality of divided cores.

Figure 2:
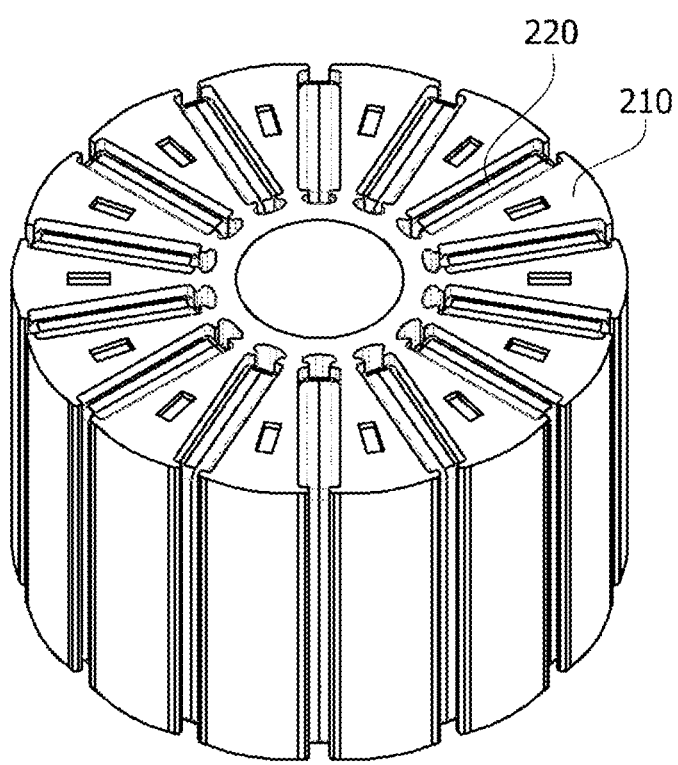
FIG. 2 is a perspective view illustrating a rotor illustrated in FIG. 1.
Figure 3:
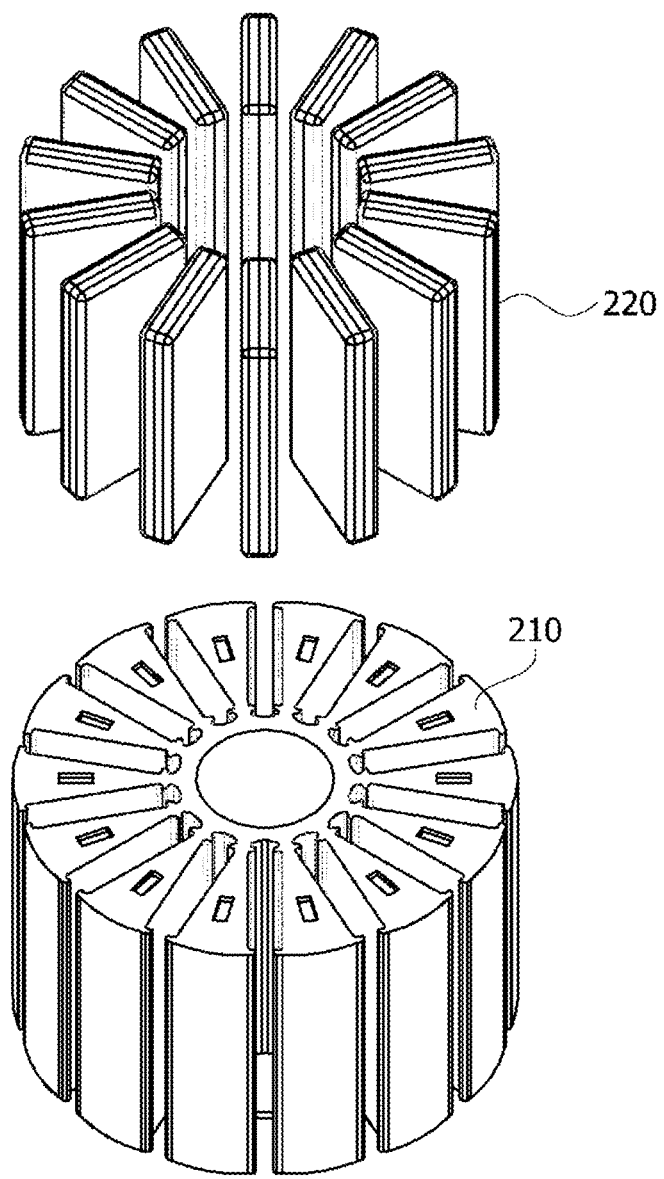
FIG. 3 is a view illustrating a rotor core and a magnet of the rotor illustrated in FIG. 2.
Figure 4:
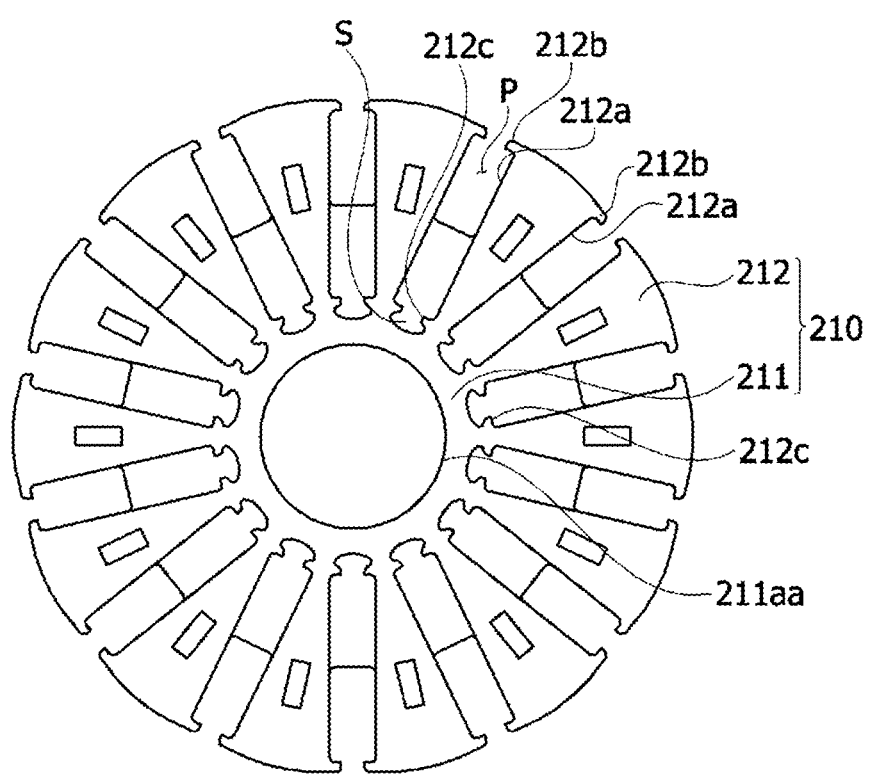
FIG. 4 is a view illustrating the rotor core.

FIG. 2 is a perspective view illustrating the rotor illustrated in FIG. 1, FIG. 3 is a view illustrating the rotor core and the magnet of the rotor illustrated in FIG. 2, and FIG. 4 is a view illustrating the rotor core.

Referring to FIGS. 2 to 4, the rotor 200 includes magnets 220 inside the rotor core 210. The plurality of magnets 220 may be radially disposed with respect to a center of the rotor core 210.

Referring to FIG. 4, the rotor core 210 may include a hub 211 and teeth 212. A hole 211aa is disposed at a center of the hub 211. The shaft 100 is coupled to the hole 211aa. The plurality of teeth 212 are radially disposed on the hub 211. In addition, the plurality of teeth 212 are disposed at predetermined intervals along a circumference of the hub 211. Spaces between the teeth 212 are pockets P. The magnets 220 are inserted into the pockets P. Inner sides of the pockets P are blocked by the hub 211 and outer sides of the pockets P are open in a radius direction of the rotor core 210. The pocket P has a rectangular shape when viewed from above.

Figure 5:
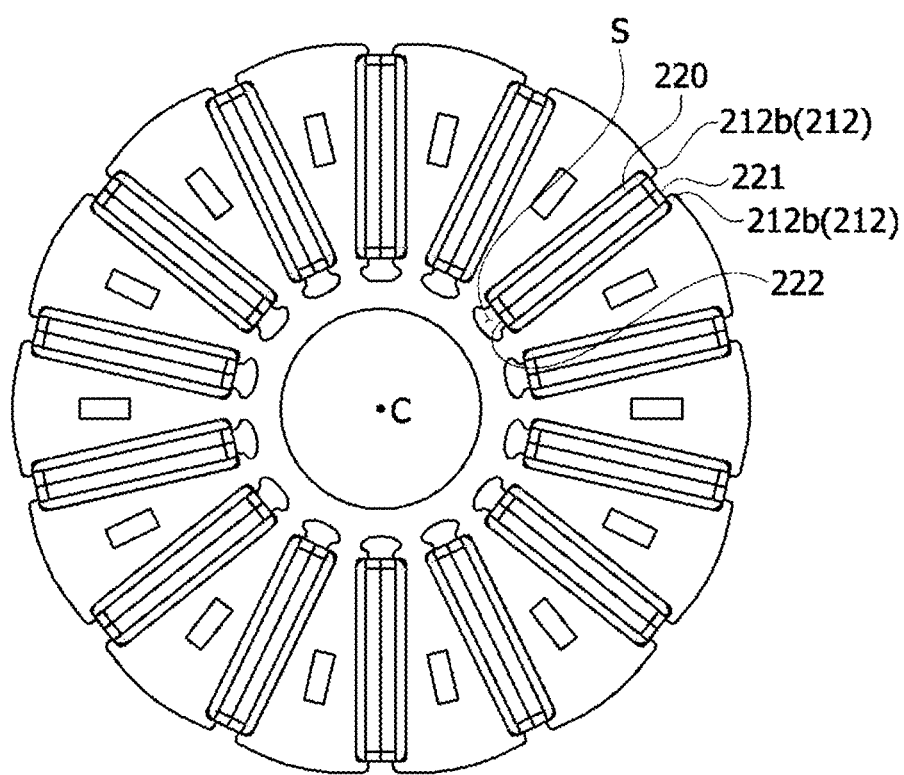
FIG. 5 is a plane view illustrating the rotor core coupled to the magnet.

FIG. 5 is a plane view illustrating the rotor core coupled to the magnet.

Referring to FIGS. 4 and 5, the teeth 212 may include first protrusions 212b. The first protrusions 212b may be disposed to protrude from both side surfaces of the teeth 212. The first protrusions 212b are disposed on outer end portions of the teeth 212 to be in contact with outer surfaces 221 of the magnets 220. The first protrusions 212b inhibit the magnets 220 from escaping from the pockets P.

The teeth 212 may include second protrusions 212c. The second protrusions 212c may be disposed to protrude from the both side surfaces 212a of the teeth 212. The second protrusions 212c are disposed on inner end portions of the teeth 212 and are in contact with inner surfaces 222 of the magnets 220.

Borders of the pockets P may be formed by the first protrusions 212b and the second protrusions 212c in a radius direction of the rotor 200. Inner regions from the second protrusions 212c toward a center C of the rotor 200 may be defined as the hub 211. Spaces S of FIG. 5 may be formed in inner sides from the second protrusions 212c toward the center C of the rotor 200. An adhesive applied to the pockets P may flow downward along the side surfaces 212a of the teeth 212, leak to the spaces S of FIG. 5, and flow downward. The embodiment is to physically block the adhesive which flows downward from leaking to the outside of the rotor core 210.

Figure 6:
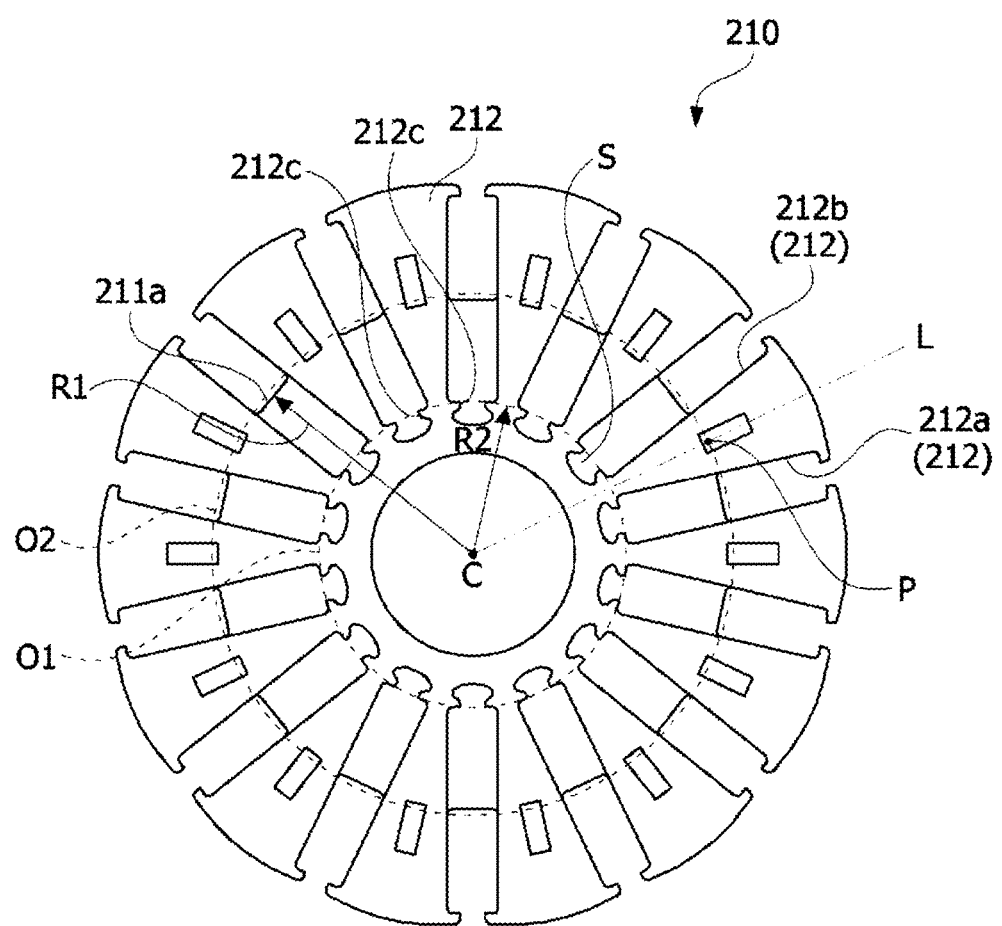
FIG. 6 is a plane view illustrating the rotor core.
Figure 7:
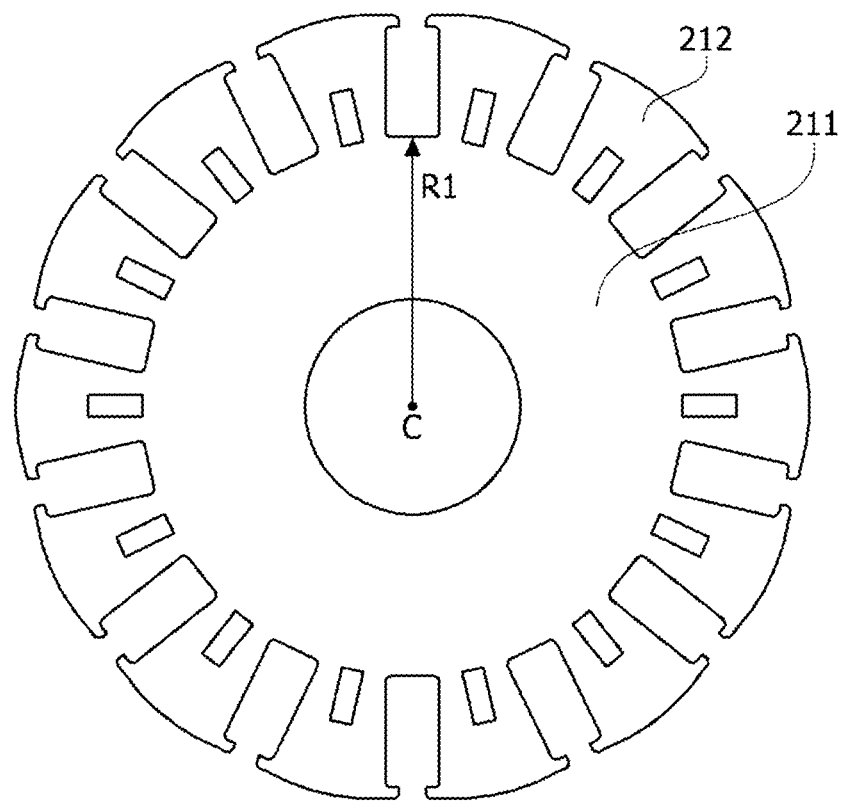
FIG. 7 is a view illustrating a lower end plate.

FIG. 6 is a plane view illustrating the rotor core and FIG. 7 is a view illustrating a lower end plate.

Referring to FIGS. 6 and 7, the rotor core 210 includes a lower end plate 210A to physically block the adhesive which flows downward. The lower end plate 210A is a plate disposed at a lowermost end among a plurality of plates forming the rotor core 210 and has a different shape from other plates.

A radius R1 of a hub of the lower end plate 210A is greater than a radius R2 of a hub of another plate, and thus the hub of the lower end plate 210A may be disposed to cover at least a part of the pocket P. A lower surface of the magnet 220 is in contact with an upper surface of the lower end plate 210A. A virtual circle O1 of the hub of FIG. 6 is a border between the hub 211 and the teeth 212. A radius of the virtual circle O1 is the radius R2 of the hub of another plate.

A reference circle O2 of FIG. 6 is a virtual circle passing through longitudinal centers P of the magnets 220 installed in the pockets P in the radius direction of the rotor 200. The centers P may be disposed at centers of the teeth 212 in a circumferential direction of the rotor 200 and disposed on reference lines L passing through a center of the rotor 200. In addition, the centers P may be centers of the teeth 212 in the radius direction of the rotor 200.

An outer circumferential surface 211a of the hub of the lower end plate 210A may be disposed inside the reference circle O2. In a case in which a region of the lower end plate 210A blocking the pocket P is too large, the adhesive may be inhibited from leaking to the outside of the rotor core 210 but performance of the motor may be degraded. Accordingly, when the outer circumferential surface 211a of the hub of the lower end plate 210A is positioned inside the reference circle O2, the performance of the motor may be secured and the adhesive may also be inhibited from leaking to the outside of the rotor core 210. The adhesive applied to the pocket P has a relatively higher possibility of flowing downward toward the center of the rotor core 210 due to a structure of the magnets 220 radially disposed with respect to the center of the rotor core 210 and a structure of the teeth 212 of which both side surfaces 212a are disposed to be inclined with respect to the reference line. Particularly, the adhesive may flow into the spaces S of FIG. 5. Accordingly, an outer side of the rotor core 210 at which an amount of adhesive flowing downward is relatively smaller is open to secure performance of the motor, and an inner side of the rotor core 210 at which an amount of adhesive flowing downward is relatively larger is blocked by the hub of the lower end plate 210A.

Figure 8:
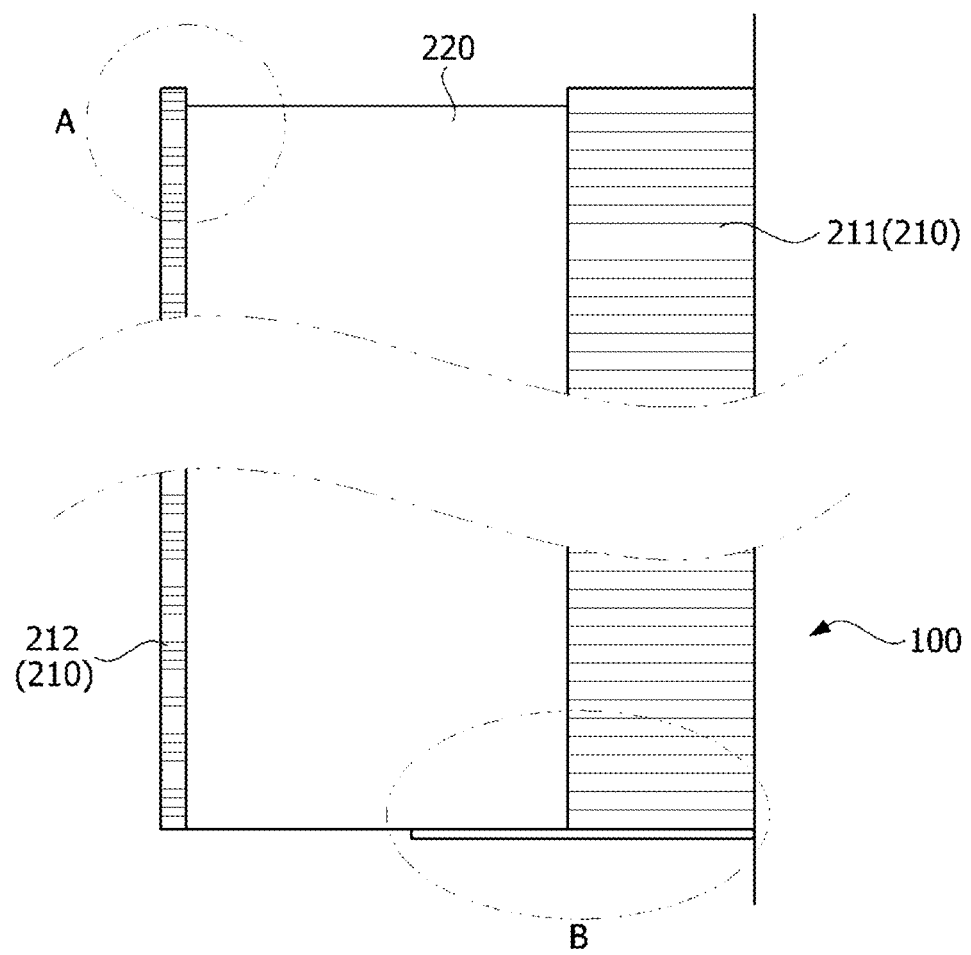
FIG. 8 is a side cross-sectional view illustrating the rotor.
Figure 9:
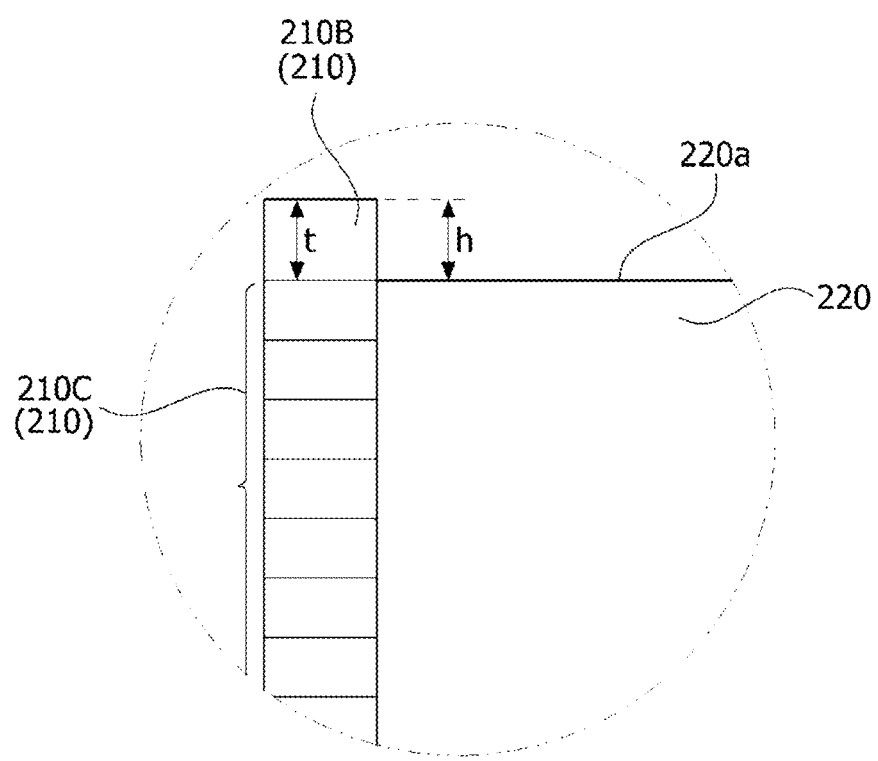
FIG. 9 is an enlarged view illustrating region A of FIG. 8 which illustrates an upper end plate.

FIG. 8 is a side cross-sectional view illustrating the rotor, and FIG. 9 is an enlarged view illustrating region A of FIG. 8 which illustrates an upper end plate.

Referring to FIGS. 8 and 9, the embodiment additionally secures performance of the motor additionally using an upper end plate 210B. The upper end plate 210B is a plate disposed at an uppermost end of the plurality of plates forming the rotor core 210 and has the same shape as other plates. The upper end plate 210B is disposed at a level higher than a level of an upper end 220a of the magnet 220. Accordingly, a difference in height h is generated between the upper end plate 210B and the magnet 220 by a thickness t of the upper end plate 210B. In this case, the thickness t of the upper end plate 210B is the same as a thickness of other plates 210c.

Figure 10:
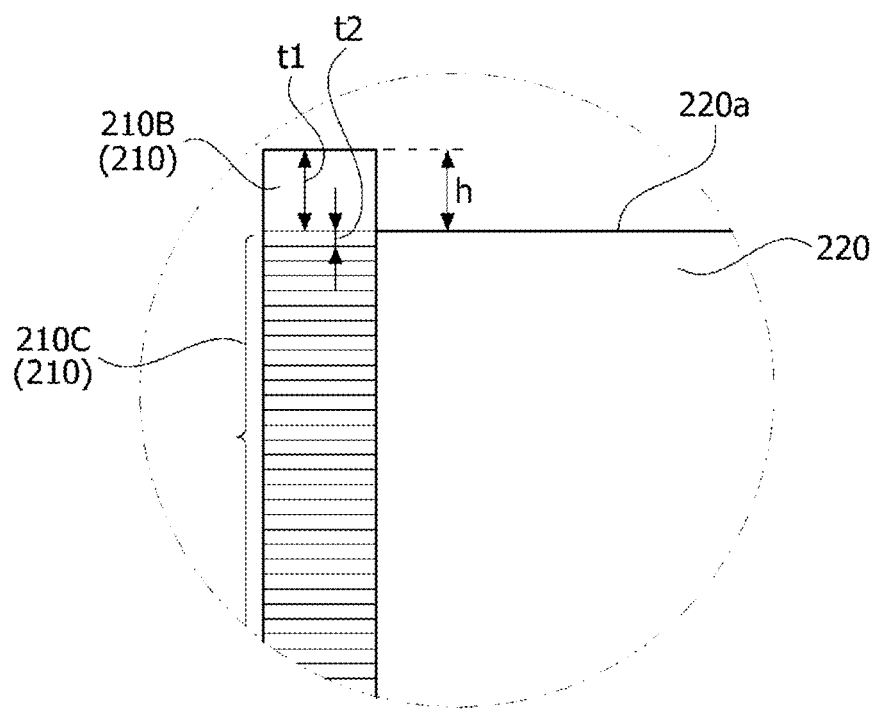
FIG. 10 is a view illustrating a modified example of the upper end plate.

FIG. 10 is a view illustrating a modified example of the upper end plate.

Referring to FIG. 10, a thickness t1 of the upper end plate 210B may be difference from a thickness t2 of other plates 210c. In this case, a shape of the upper end plate 210B may be the same as a shape of other plates 210c when viewed from above. The thickness t1 of the upper end plate 210B may be designed to be greater than the thickness t2 of the other plates 210c to be in correspondence with required performance of the motor.

Figure 11:
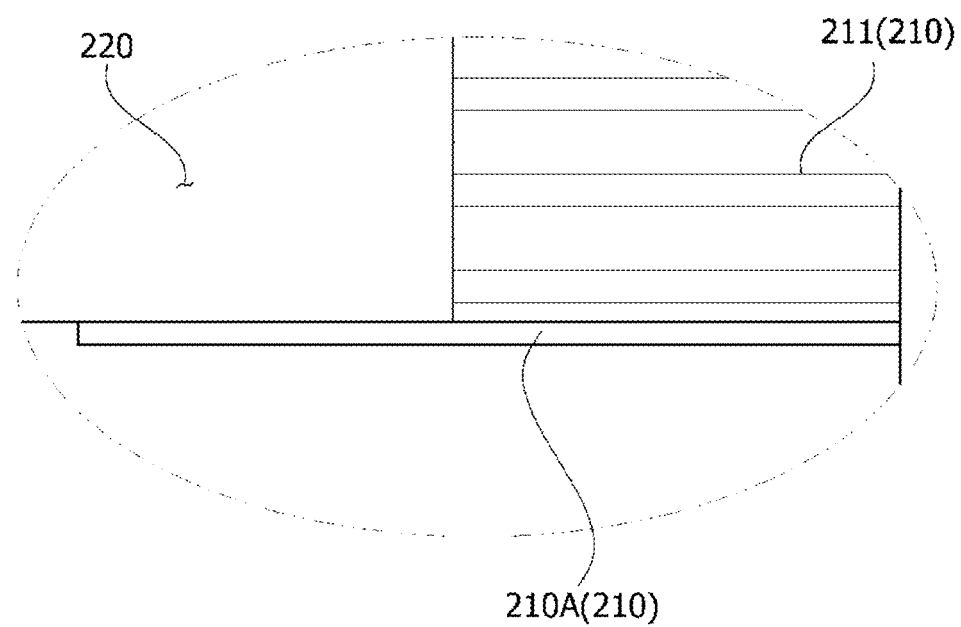
FIG. 11 is an enlarged view illustrating region B of FIG. 8 which illustrates a lower end plate.
Figure 12:
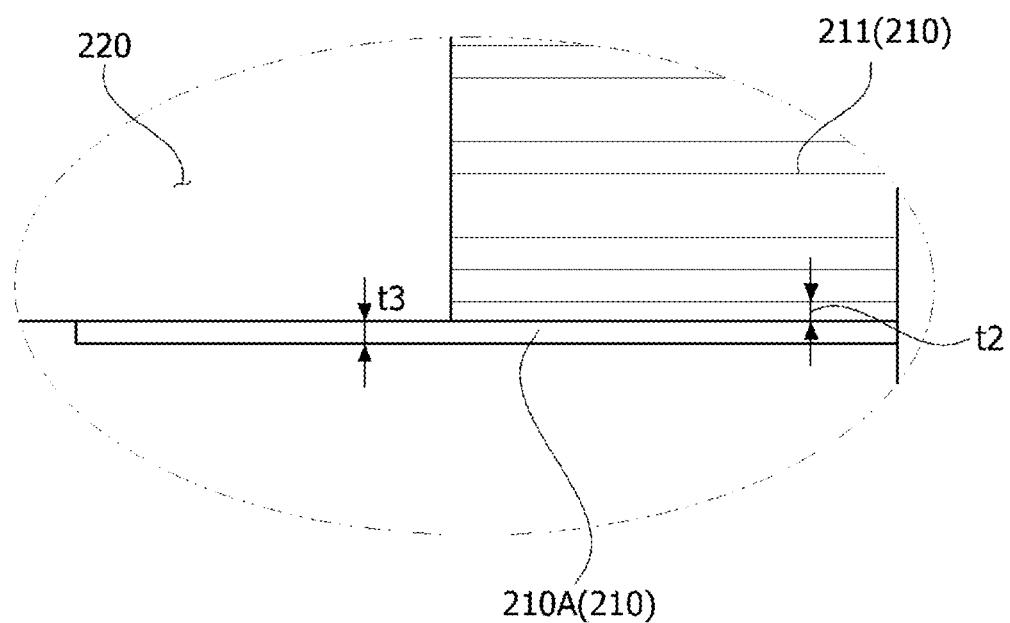
FIG. 12 is a view illustrating a modified example of the lower end plate.

FIG. 11 is an enlarged view illustrating region B of FIG. 8 which illustrates a lower end plate, and FIG. 12 is a view illustrating a modified example of the lower end plate.

Referring to FIG. 11, the lower end plate 210A is in contact with a lower end of the magnet 220. Since the lower end plate 210A blocks the inner side of the rotor core 210, the lower end plate 210A inhibits the adhesive which flows downward from the pocket P from leaking to the outside of the rotor core 210. Referring to FIG. 12, a thickness t3 of the lower end plate 210A may be different from a thickness t2 of other plates 210c. The thickness t3 of the lower end plate 210A may be designed to be greater than the thickness t2 of other plates 210c in consideration of structural stability of the lower end plate 210A which is in contact with the magnet 220.

Figure 13:
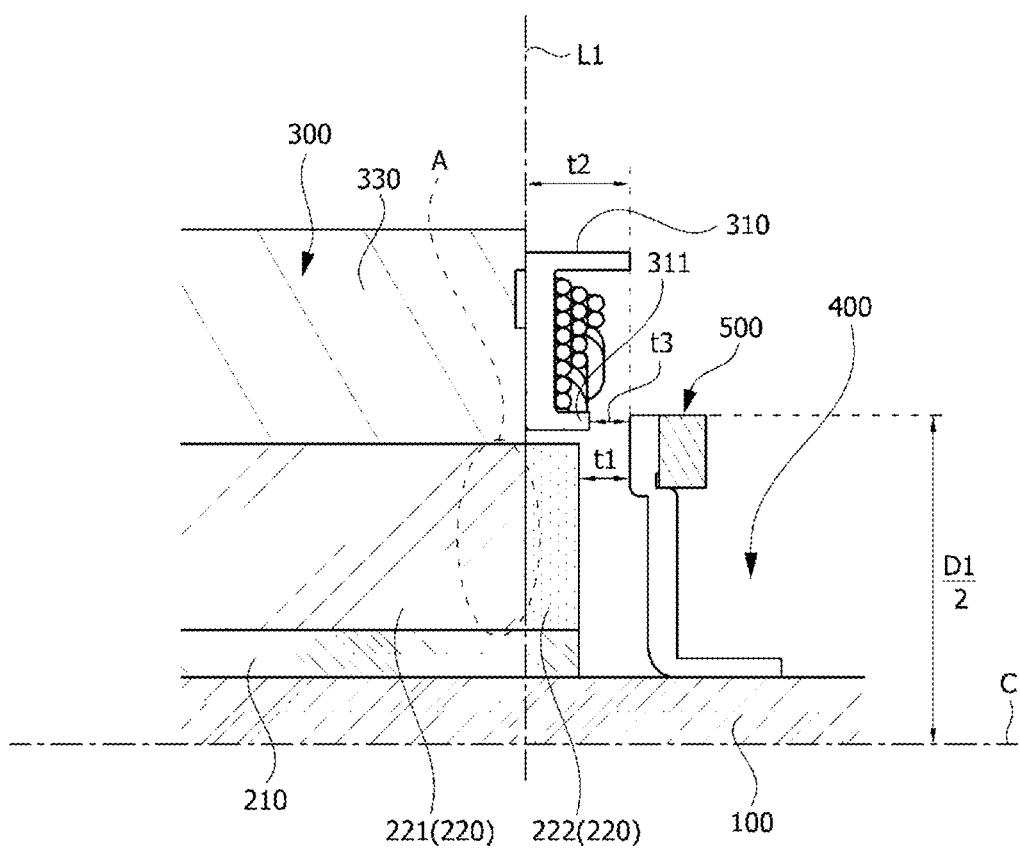
FIG. 13 is a cross-sectional view illustrating positions of the magnet and the sensing plate.

FIG. 13 is a cross-sectional view illustrating positions of the magnet and the sensing plate.

Referring to FIG. 13, a sensing plate 400 is coupled to the shaft 100. The sensing plate 400 has a disc shape, and a central portion of the sensing plate 400 is press-fitted into the shaft 100. The sensing plate 400 is disposed above the magnet 220.

A sensing magnet 500 is seated on the sensing plate 400. The sensing magnet 500 may have a disc shape in which a hole is disposed at a center of the sensing magnet 500. The sensing magnet 500 may include main-magnets disposed at the center thereof and sub-magnets disposed at an edge thereof. The number of the main-magnets (poles) may be the same as the number of the magnets 220 (poles) to detect a position of the rotor 200. The sub-magnets are disposed at the edge of a disc and the number of the sub-magnets (poles) may be greater than the number of the main-magnets (poles). Accordingly, since the sub-magnets are further subdivided and distinguished from one pole (divided magnet) of the main-magnet, a position of the rotor can be more precisely measured.

Referring to FIG. 13, an upper end region A of the magnet 220 of FIG. 13 is a region in which magnetization is hindered due to the sensing plate 400 disposed adjacent to the upper end region A. The upper end region A of the magnet 220 and the sensing plate 400 are disposed to be adjacent to each other in an axial direction of the shaft 100, and a minimum distance is maintained between the upper end region A and the sensing plate 400 in consideration of a length of the motor. In a state in which the shaft 100 is coupled to the sensing magnet 500 and the magnet 220, the sensing magnet 500 and the magnet 220 are simultaneously magnetized, and the sensing plate 400 hinders a magnetic flux from flowing toward the upper end region A of the magnet 220. Accordingly, the magnetic flux flow for magnetization is stopped in the upper end region A of the magnet 220 so that the upper end region A of the magnet 220 is incompletely magnetized.

In the motor according to the embodiment, a first distance t1 is less than a second distance t2 in the axial direction of the shaft 100 so as to solve the above-described issue. In this case, the first distance t1 is a distance between an upper end of the magnet 220 and a lower surface of the sensing plate 400 in the axial direction of the shaft 100. In addition, the second distance t2 is a distance between an upper end of the stator core 330 and the lower surface of the sensing plate 400.

For example, the magnet 220 includes a second region 222. The magnet 220 may be divided into a first region 221 and the second region 222 in the axial direction of the shaft 100 based on a reference line L1 passing through the upper end of the stator core 330. The first region 221 of the magnet 220 is a region positioned below an upper end of the stator 300. In addition, the second region 222 of the magnet 220 is a region disposed below the upper end of the stator 300. The second region 222 is disposed to extend from the first region 221. The first distance t1 is a distance between an upper end of the second region 222 and the lower surface of the sensing plate 400.

In this case, a difference between the second distance t2 and the first distance t1 may range from 0.3 mm to 0.9 mm. Meanwhile, the first distance t1 is greater than a third distance t3. In this case, the third distance t3 is a distance between an upper end of an inner guide 311 of an insulator 310 and the lower surface of the sensing plate 400 in the axial direction of the shaft 100.

A position of a lower end of the stator core 330 and a position of the lower end of the magnet 220 are set to be the same in the axial direction of the shaft 100 with respect to a reference line L2 passing through the lower end of the stator core 330. Meanwhile, an outer diameter D2 of the magnet 220 is less than an outer diameter D1 of the sensing plate 400.

When the sensing magnet 500 and the magnet 220 are simultaneously magnetized, since the second region 222 is disposed close to the sensing plate 400, the second region 222 is incompletely magnetized or is not magnetized. Since the second region 222 corresponds to an end portion of the magnet 220, in a case in which a magnetic flux flow is hindered by the sensing plate 400, the magnetic flux flow is blocked so that the second region 222 is incompletely magnetized. Accordingly, the second region 222 is a non-magnetized region or an incompletely magnetized region which does not affect performance of the motor significantly. Accordingly, the second region 222 is a region in which a magnetic flux density is less than a reference value thereof and corresponds to a region only for helping magnetization of the first region 221. Conversely, the first region 221 corresponds to a region of which magnetization is relatively not hindered by the sensing plate 400 when being magnetized. The first region 221 is a region in which a magnetic flux density is significantly secured and performance of the motor is affected.

The upper end region A of the magnet 220 corresponds to the first region 221. The upper end region A of the magnet 220 is disposed on a path of a magnetic flux flow toward the second region 222. The second region 222 disposed on the end portion of the magnet 220 is an incompletely magnetized region but causes the upper end region A of the magnet 220 to be completely magnetized. As described above, although the second region 222 is incompletely magnetized or is not magnetized, there is an advantage in that the upper end region A of the magnet 220 affecting performance of the motor is completely magnetized due to presence of the second region 222.

Figure 14:
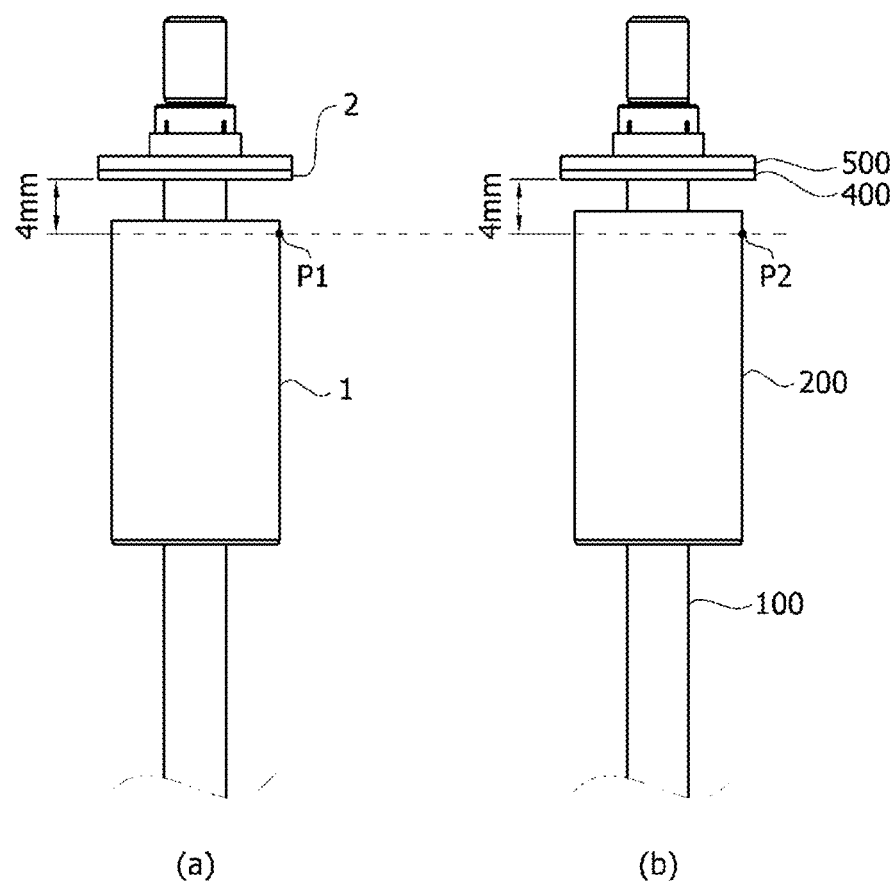
FIG. 14 is a view illustrating a measurement position of a magnetic flux density of a comparison embodiment and a measurement position of a magnetic flux density of the embodiment.

FIG. 14 is a view illustrating a measurement position of a magnetic flux density of a comparison embodiment and a measurement position of a magnetic flux density of the embodiment.

Referring to FIG. 14, P1 of FIG. 14A is a measurement position of a magnetic flux density of the comparison embodiment and is one position of a magnet 1 spaced apart from a sensing plate 2 by 4 mm in a shaft direction. In a motor according to the comparison embodiment, an upper end of a magnet and an upper end of a stator are positioned at the same level and a component corresponding to the second region 222 of the embodiment is not included in the motor. P2 of FIG. 4 is a measurement position of a magnetic flux density of the embodiment, is one position of the magnet 220 spaced apart from the sensing plate 400 by 4 mm in the shaft direction, and is positioned at the same level of P1 in the shaft direction.

Figure 15:
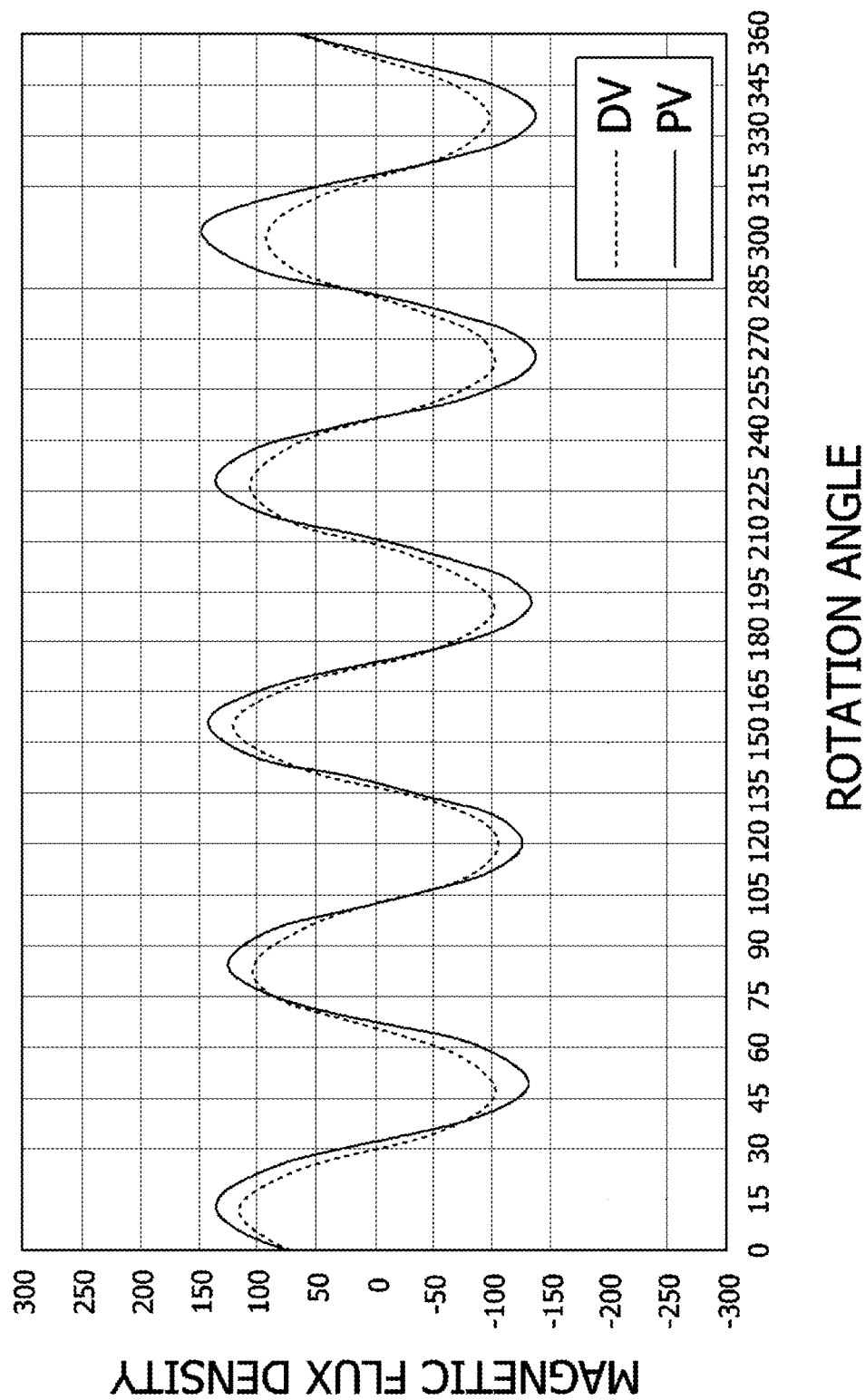
FIG. 15 is a view illustrating the magnetic flux density of the comparison embodiment and the magnetic flux density of the embodiment.

FIG. 15 is a view illustrating the magnetic flux density of the comparison embodiment and the magnetic flux density of the embodiment.

Referring to FIG. 15, a magnetic flux density PV of the embodiment at P2 of FIG. 14 is relatively greater than a magnetic flux density DV of the comparison embodiment at P1 of FIG. 14. It may be seen that the magnetic flux density of the embodiment including the second region 222 is greater than the magnetic flux density of the comparison embodiment. As a result, based on magnetization at one position of the magnet 1 spaced apart from the sensing plate 2 by 4 mm, it may be seen that magnetization is incompletely performed in the comparison embodiment, and magnetization is completely performed in the embodiment.

A motor according to one exemplary embodiment of the present invention has been described in detail with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a shaft;
a rotor disposed outside the shaft; and
a stator disposed outside the rotor,
wherein the rotor includes a rotor core and a magnet disposed on the rotor core,
wherein the rotor core includes a pocket in which the magnet is disposed,
wherein the rotor core is formed by stacking a plurality of plates,
wherein each plate of the plurality of plates includes an annular hub and a plurality of teeth radially protruding from the hub,
wherein an upper end plate of the plurality of plates is disposed at a level higher than a level of the magnet,
wherein the hub of a lower end plate of the plurality of plates is disposed to cover at least a part of the pocket, and
wherein a radius of the hub of the lower end plate of the plurality of plates is greater than a radius of the hub of another plate.

2. The motor of claim 1, wherein the magnet is in contact with the hub of the lower end plate.

3. The motor of claim 2, wherein, within each plate of the plurality of plates, a side surface of each of the teeth is disposed to be inclined with respect to a reference line passing through a center of each of the teeth and a center of the rotor in a circumferential direction of the rotor.

4. The motor of claim 2, wherein, within each plate of the plurality of plates, each tooth of the plurality of teeth comprises a first protrusion protruding from a side surface thereof and in contact with an outer surface of the magnet.

5. The motor of claim 4, wherein among the plurality of plates, the plates excluding the lower end plate include a second protrusion in contact with an inner surface of the magnet.

6. The motor of claim 1, wherein the radius of the hub of the lower end plate is less than radius of a reference circle that is a virtual circle passing through longitudinal centers of the magnets disposed in the pockets in a radius direction of the rotor.

7. The motor of claim 1, wherein an outer circumferential surface of the hub of the lower end plate is disposed inside a reference circle passing through a longitudinal center of the magnet in a radius direction of the rotor.

8. The motor of claim 1, wherein a lower surface of the magnet is in contact with an upper surface of the lower end plate.

9. The motor of claim 2, A motor comprising:
a shaft;
a rotor disposed outside the shaft; and
a stator disposed outside the rotor,
wherein the rotor includes a rotor core and a magnet disposed on the rotor core,
wherein the rotor core includes a pocket in which the magnet is disposed,
wherein the rotor core is formed by stacking a plurality of plates,
wherein each plate of the plurality of plates includes an annular hub and a plurality of teeth radially protruding from the hub,
wherein an upper end plate of the plurality of plates is disposed at a level higher than a level of the magnet,
wherein the hub of a lower end plate of the plurality of plates is disposed to cover at least a art of the pocket,
wherein the magnet is in contact with the hub of the lower end plate, and
wherein the teeth of the upper end plate are not in contact with the magnet.

10. A motor comprising:
a shaft;
a rotor disposed outside the shaft;
a stator disposed outside the rotor;
a sensing plate coupled to the shaft and disposed above the rotor; and
a sensing magnet coupled to the sensing plate,
wherein the rotor includes a rotor core and a magnet disposed on the rotor core,
wherein the rotor core includes a pocket in which the magnet is disposed,
wherein the rotor core is formed by stacking a plurality of plates,
wherein a lower end plate of the plurality of plates is disposed to cover at least a part of the pocket,
wherein an upper end plate of the plurality of plates is disposed at a level higher than a level of the magnet, and
wherein a first distance between the sensing plate and the magnet is less than a second distance between the sensing plate and a stator core of the stator in an axial direction of the shaft.

11. The motor of claim 10, wherein a difference value between the second distance and the first distance ranges from 0.3 mm to 0.9 mm.

12. The motor of claim 10, wherein:
the magnet is divided into a first region disposed at a lower side and a second region disposed at an upper side with respect to an upper end of the stator core in the axial direction of the shaft; and
a magnetic flux density of the second region is less than a magnetic flux density of the first region.

13. The motor of claim 10, wherein:
the magnet is divided into a first region disposed at a lower side and a second region disposed at an upper side with respect to an upper end of the stator core in the axial direction of the shaft; and
the second region is a non-magnetized region.

14. The motor of claim 10, wherein the stator includes an insulator installed on the stator core; and
the first distance is greater than a third distance between an inner guide of the insulator and the sensing plate in the axial direction of the shaft.

* * * * *